(12) United States Patent
Houst et al.

(10) Patent No.: US 9,429,162 B2
(45) Date of Patent: Aug. 30, 2016

(54) AXIAL TURBINE WITH SECTOR-DIVIDED TURBINE HOUSING

(71) Applicant: Honeywell International Inc., Morristown, NJ (US)

(72) Inventors: Vit Houst, Sestajovice (CZ); Vaclav Kares, Strakonice (CZ)

(73) Assignee: Honeywell International Inc., Morris Plains, NJ (US)

( * ) Notice: Subject to any disclaimer, the term of this patent is extended or adjusted under 35 U.S.C. 154(b) by 842 days.

(21) Appl. No.: 13/757,145

(22) Filed: Feb. 1, 2013

(65) Prior Publication Data

US 2014/0219790 A1    Aug. 7, 2014

(51) Int. Cl.
*F01D 9/02* (2006.01)
*F04D 19/00* (2006.01)
*F02C 6/12* (2006.01)

(52) U.S. Cl.
CPC .............. *F04D 19/00* (2013.01); *F01D 9/026* (2013.01); *F02C 6/12* (2013.01)

(58) Field of Classification Search
CPC ........ F01D 9/026; F01D 9/045; F01D 9/048; F01D 25/145; F01D 25/24; F04D 29/403; F04D 29/441; F02C 6/12; F05D 2220/40; F05D 2210/42; F05D 2210/43; F05D 2240/15; F05D 2250/51; F05D 2260/14
See application file for complete search history.

(56) References Cited

U.S. PATENT DOCUMENTS

| | | | |
|---|---|---|---|
| 4,027,994 A | 6/1977 | Macinnes | |
| 5,094,587 A * | 3/1992 | Woollenweber | F01D 9/026 415/205 |
| 6,260,358 B1 | 7/2001 | Daudel et al. | |
| 2011/0252789 A1 | 10/2011 | Kares et al. | |
| 2011/0252790 A1 | 10/2011 | Lotterman et al. | |
| 2011/0252791 A1 | 10/2011 | Lotterman et al. | |
| 2011/0252792 A1 | 10/2011 | Kares et al. | |
| 2011/0274539 A1 * | 11/2011 | Koenigsegg | F01D 9/026 415/204 |

* cited by examiner

*Primary Examiner* — Dwayne J White
*Assistant Examiner* — Juan G Flores
(74) *Attorney, Agent, or Firm* — John C. James

(57) ABSTRACT

A statorless or nozzleless axial turbine for a turbocharger has an axial turbine wheel that receives a swirling flow of exhaust gas substantially in an axial direction. The turbine includes a sector-divided turbine housing defining a plurality of separate exhaust gas inlets each for receiving a separate exhaust gas stream from an internal combustion engine, the sector-divided turbine housing further defining a plurality of separate angular sector passageways each of which occupies a fractional part of a circumference surrounding the turbine wheel, each angular sector passageway being supplied with exhaust gas by a respective one of the plurality of exhaust gas inlets. The turbine housing assembly defines a separate sector outlet for each angular sector passageway. The turbine housing assembly can include a separately formed heat shroud, and the sector outlets can be formed at least in part by the heat shroud.

10 Claims, 7 Drawing Sheets

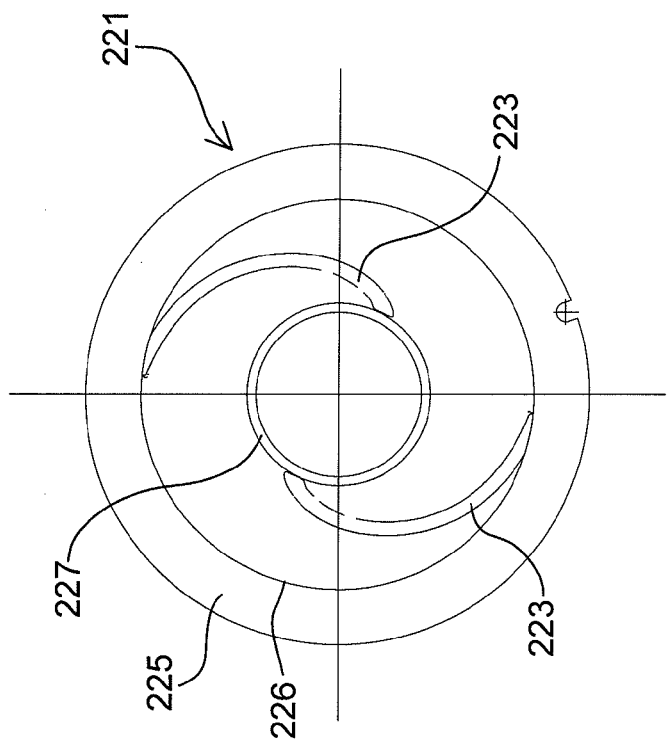
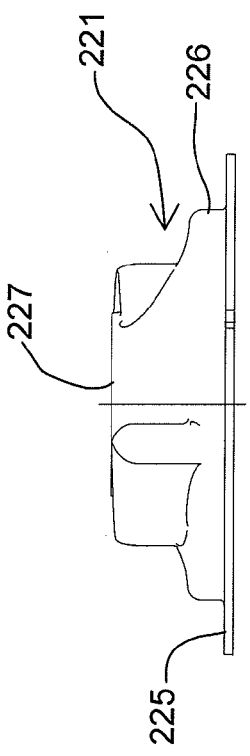
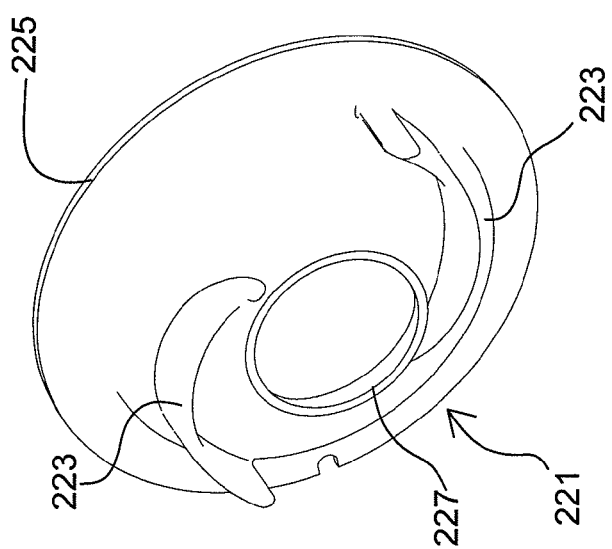
FIG. 6
FIG. 7
FIG. 5

AXIAL TURBINE WITH SECTOR-DIVIDED TURBINE HOUSING

BACKGROUND OF THE INVENTION

The invention relates to turbochargers in which a turbine of the turbocharger is driven by exhaust gas from a reciprocating engine. The invention relates more particularly to turbine housings that are divided into a plurality of substantially separate sections each fed by a separate exhaust system.

In multiple-piston reciprocating engines, it is known to design the exhaust system in such a manner as to take advantage of the pressure pulsation that occurs in the exhaust stream. In particular, it is known to employ what is known as "pulse separation" wherein the cylinders of the engine are divided into a plurality of subgroups, and the pulses from each subgroup of cylinders are substantially isolated from those of the other subgroups by having independent exhaust passages for each subgroup. To take best advantage of pulse separation, it is desired to minimize the communication or "cross talk" between the separate groups of cylinders. Accordingly, in the case of a turbocharged engine, it is advantageous to maintain separate exhaust passages all the way into the turbine of the turbocharger. Thus, the turbine housing into which the exhaust gases are fed is typically divided into a plurality of substantially separate parts.

There are basically two ways in which turbine housings have been divided: (1) meridional division, and (2) sector division. In a meridionally divided turbine housing, the generally annular volute or chamber that surrounds the turbine wheel and into which the exhaust gases are fed is divided into a plurality of passages in the meridional plane such that each passage occupies a full circumference and the passages succeed each other in the axial direction, such as shown in FIG. 4 of U.S. Pat. No. 4,027,994.

The present invention relates instead to sector-divided turbine housings. In a sector-divided turbine housing, the generally annular chamber is divided into angular sectors each of which occupies only a part of the circumference such that the passages succeed each other in the circumferential direction, such as shown in FIG. 2 of U.S. Pat. No. 6,260,358. That figure also shows guide vanes 12 that are positioned just radially inwardly of the chamber and guide the flow into the turbine wheel.

BRIEF SUMMARY OF THE DISCLOSURE

The present disclosure relates in particular to a turbine for a turbocharger, and to a turbocharger having such a turbine, in which a sector-divided turbine housing feds a plurality of separate exhaust gas streams to a "statorless" axial turbine. The term "statorless" means that the turbine has rotating blades but no stators, and in particular has no inlet stator for guiding flow into the blades. Such inlet stators are often called "nozzles" in the axial turbine field, and hence the axial turbine of the present disclosure can also be called "nozzleless."

Thus, in one embodiment disclosed herein, a statorless axial turbine comprises an axial turbine wheel comprising a hub and a plurality of blades extending generally radially outward from the hub, and a turbine housing assembly that houses the turbine wheel. The turbine housing assembly comprises a sector-divided turbine housing, the sector-divided turbine housing defining a plurality of separate exhaust gas inlets into the turbine housing. Each exhaust gas inlet receives a separate exhaust gas stream from an internal combustion engine. The sector-divided turbine housing defines a plurality of separate angular sector passageways each of which occupies a fractional part of a circumference surrounding the turbine wheel, the angular sector passageways succeeding one another in a circumferential direction. Each angular sector passageway is supplied with exhaust gas by a respective one of the plurality of exhaust gas inlets, each angular sector passageway being characterized by a convergent cross-section that spirals inward and converges to accelerate the exhaust gas.

The turbine housing assembly defines a separate sector outlet for each angular sector passageway through which the respective exhaust gas stream is fed into an inlet side of the turbine wheel generally in an axial direction of the turbine wheel.

In one embodiment the turbine housing assembly comprises the sector-divided turbine housing and a separately formed heat shroud, and the sector outlets are formed at least in part by the heat shroud.

The heat shroud can include a radial flange portion and, connected to the radial flange portion, a plurality of dividing walls that extend radially inwardly and circumferentially in a spiral fashion so as to divide the separate sector outlets from one another.

In one embodiment, the heat shroud has a tapering portion that extends axially away from the radial flange portion and decreases in radius toward the inlet side of the turbine wheel to form a radially inner boundary of an axial inlet to the turbine wheel.

An outer diameter of the turbine wheel, as defined by radially outer tips of the blades, can be generally constant from the inlet side to an outlet side of the turbine wheel.

In one embodiment, there are two said exhaust gas inlets and two said angular sector passageways, each of the angular sector passageways occupying substantially 180 degrees along the circumference. However, the invention is not limited to two sectors, and more than two can be employed if desired.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is a perspective view of a sector-dividing member of the turbine assembly;

FIG. 6 is an axial view of the sector-dividing member;

FIG. 7 is a side view of the sector-dividing member; and

DETAILED DESCRIPTION OF THE DRAWINGS

Figure 1:
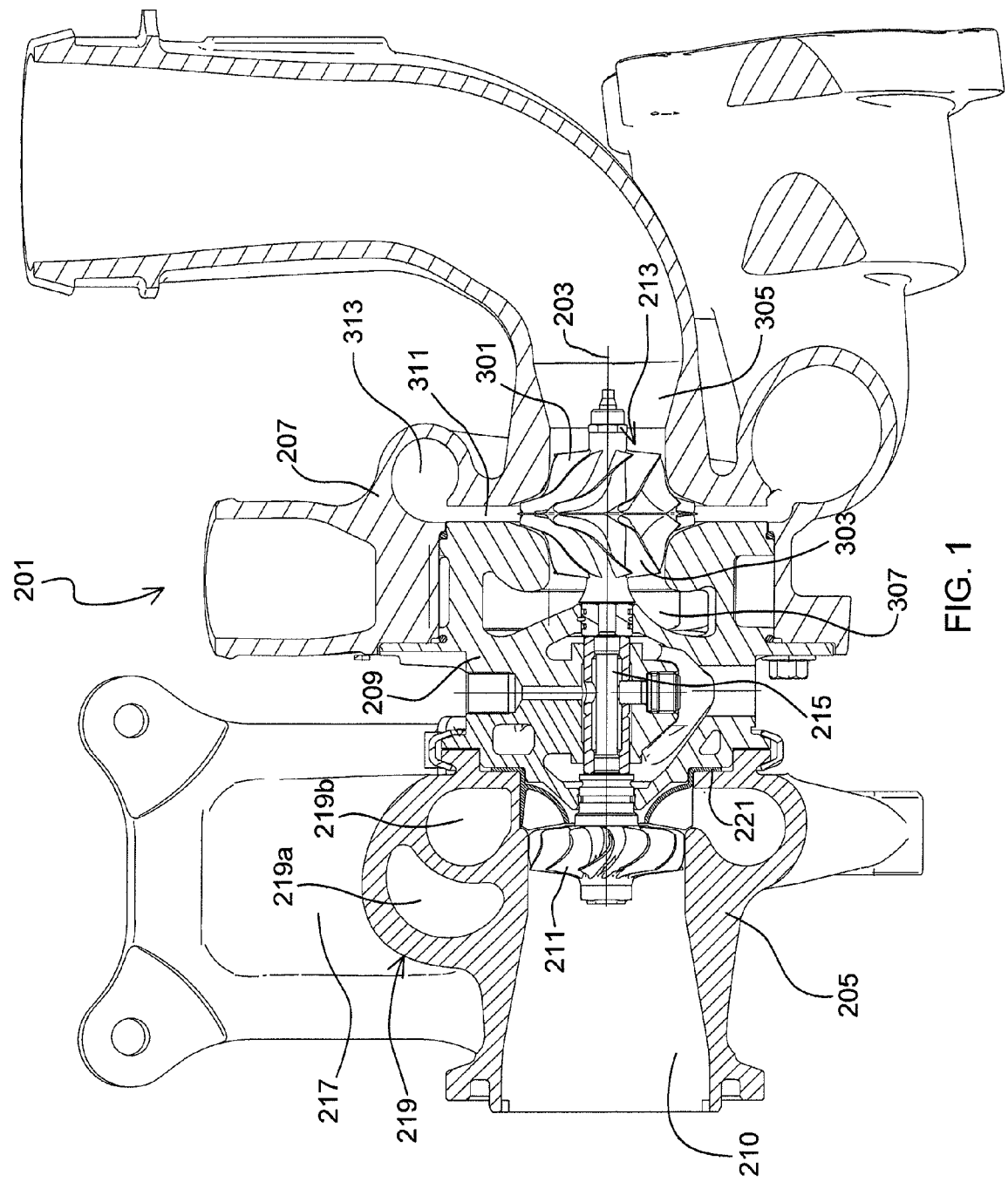
FIG. 1 is an axial cross-sectional view of a turbocharger in accordance with one embodiment of the invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a turbocharger 201 in accordance with one embodiment of the invention. The turbocharger 201 is similar in many respects to that described in U.S. Pat. No. 8,353,161, U.S. patent application Ser. No. 12/799,182, U.S. patent application Ser. No. 12/799,195, and U.S. patent application Ser. No. 12/799,196, all of which are incorporated herein by reference. With reference to FIG. 1, in one embodiment of the invention the turbocharger 201 includes a turbocharger housing and a rotor configured to rotate within the turbocharger housing along an axis 203 of rotor rotation on a set of bearings. The turbocharger housing includes a turbine housing 205, a compressor housing 207, and a bearing housing 209 (i.e., a center housing that contains radial and thrust bearings) that connects the turbine housing to the compressor housing. The rotor includes an axial turbine wheel 211 located substantially within the turbine housing, a radial compressor wheel 213 located substantially within the compressor housing, and a shaft 215 extending along the axis of rotor rotation, through the bearing housing, to connect the turbine wheel to the compressor wheel and provide for the turbine wheel to drive the compressor wheel in rotation around the rotation axis 203.

The turbine housing 205 and turbine wheel 211 form a turbine, or turbine assembly, configured to receive high-pressure and high-temperature exhaust gas from an exhaust manifold of an engine. The turbine wheel (and thus the rotor) is driven in rotation around the axis of rotor rotation 203 by the high-pressure and high-temperature exhaust gas acting on a plurality of blades 231 of the turbine wheel. The exhaust gas is expanded to a lower total pressure while passing through the blades, and is subsequently axially released via a turbine outlet 210 into an exhaust system (not shown).

The turbine wheel 211 is an axial-flow turbine wheel, meaning that exhaust gas enters the wheel in a substantially axial direction (although the flow has a substantial circumferential or swirl component of direction), as distinguished from a radial-inflow wheel where the incoming flow is directed substantially radially inwardly to the wheel. An outer diameter of the turbine wheel 211, as defined by radially outer tips of the blades 231, is generally constant from the inlet side to an outlet side of the turbine wheel.

The compressor housing 207 and compressor wheel 213 form a radial compressor. The compressor wheel, being driven in rotation by the exhaust-gas driven turbine wheel 211 via the shaft 215, is configured to compress axially received input air (e.g., ambient air, or already-pressurized air from a previous-stage in a multi-stage compressor) into a pressurized air stream that may be ejected circumferentially and radially from the compressor and sent on to an engine intake.

Figure 1A:
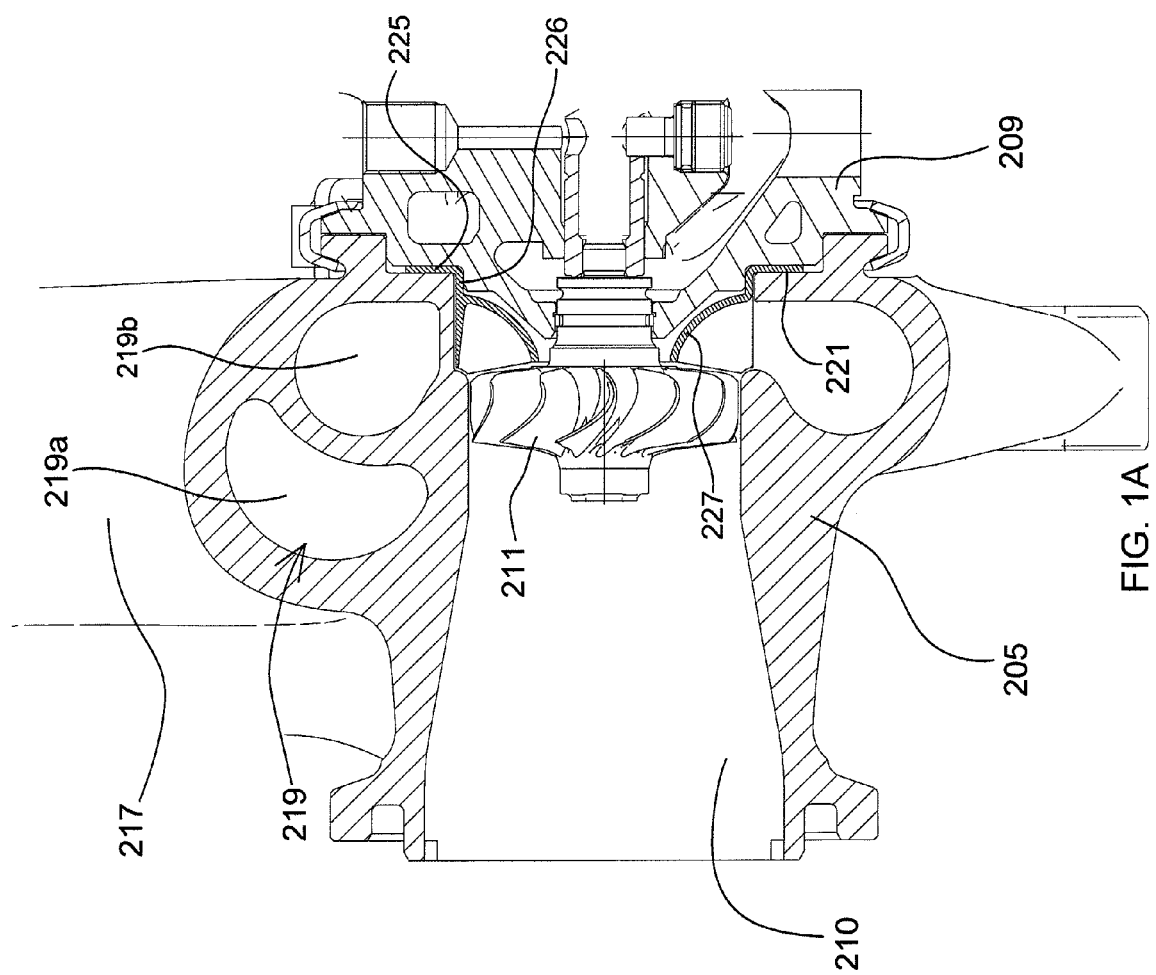
FIG. 1A is an enlarged portion of FIG. 1.
Figure 2:
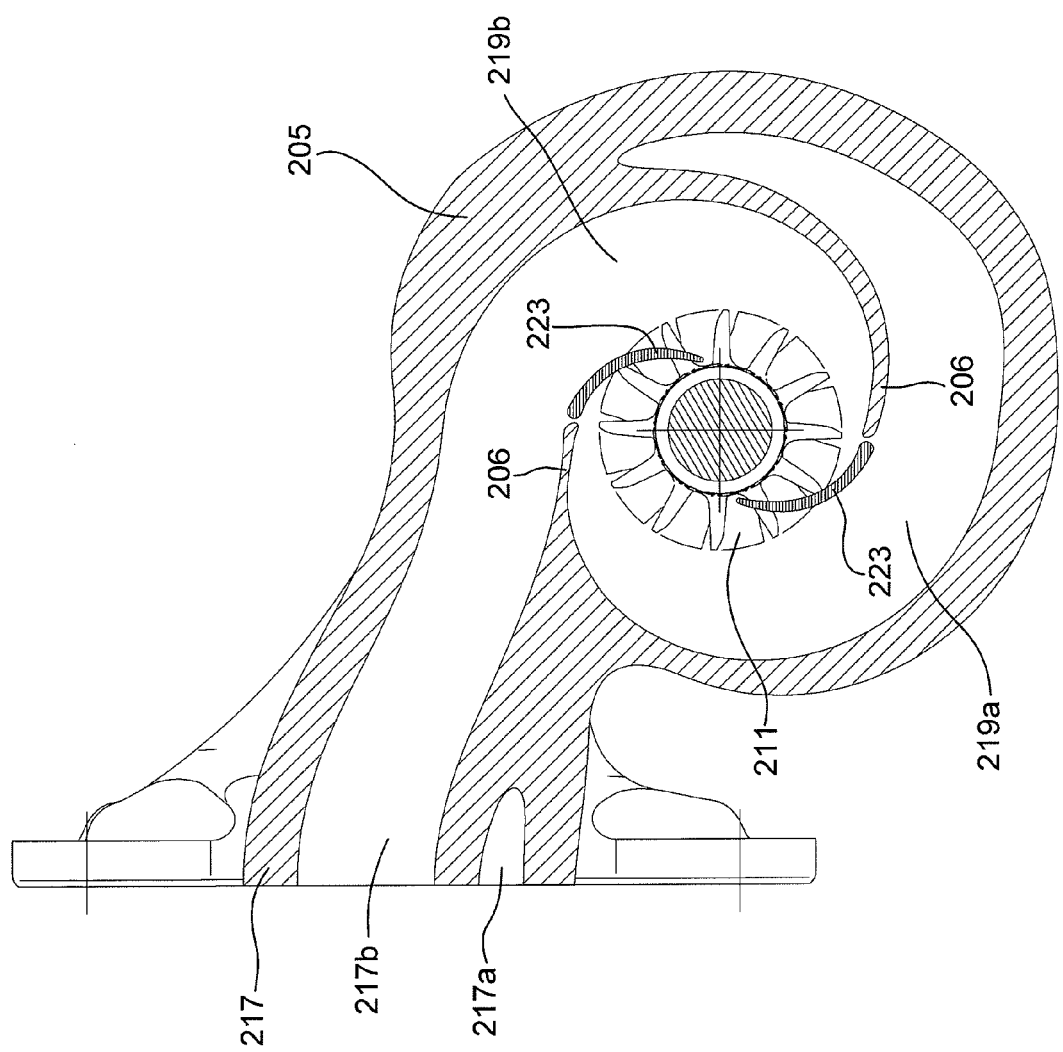
FIG. 2 is a sectioned view of a turbine assembly in accordance with one embodiment of the invention.

With reference to FIGS. 1, 1A, and 2, the turbine housing 205 forms an exhaust gas entrance passageway 217 configured to receive the exhaust gas from the engine in a direction normal to and radially offset from the rotor rotation axis 203. It is advantageous to design a reciprocating engine's exhaust system in such a manner as to take advantage of the pressure pulsation that occurs in the exhaust stream. In particular, it is known to employ what is known as "pulse separation" wherein the cylinders of the engine are divided into a plurality of subgroups, and the pulses from each subgroup of cylinders are isolated from those of the other subgroups by having independent exhaust passages for each subgroup. To take best advantage of pulse separation, it is desired to minimize the communication or cross talk between the separate exhaust passages. Accordingly, in the case of a turbocharged engine, it is advantageous to maintain separate exhaust passages all the way into the turbine of the turbocharger. To this end, the turbine housing 205 of the turbocharger advantageously comprises a sector-divided turbine housing. Specifically, the exhaust gas entrance passageway 217 defines two separate passages 217a and 217b, one passage receiving exhaust gas from one subgroup of engine cylinders and the other passage receiving exhaust gas from the other subgroup of engine cylinders. The turbine housing also defines a generally annular chamber 219 that is divided into two angular sectors 219a and 219b that are separate from one another and are respectively fed with exhaust gas via the separate passages 217a and 217b of the exhaust gas entrance passageway. Various numbers of sectors can be employed in accordance with the invention, so while two sectors are illustrated in the drawings, more than two can be employed if desired.

FIGS. 1 through 4 depict one embodiment of a turbine assembly in accordance with the invention, wherein the generally annular chamber 219 is divided into two angular sectors 219a and 219b each occupying approximately 180 degrees of the circumference of the chamber. The chamber is divided into the sectors by a sector-dividing member 221 installed in the turbine housing. The sector-dividing member 221, which also serves as a heat shroud between the relatively hot turbine housing and the relatively cooler center housing, defines a pair of dividing "tongues" or walls 223 that extend generally radially inwardly (but typically also with a substantial circumferential or tangential directional component). The dividing walls 223 effectively serve as extensions of respective walls 206 (FIG. 2) of the turbine housing 205 that divide the outlets of the angular sectors 219a and 219b from each other. In another embodiment (not illustrated), the dividing walls 223 can be integral with the turbine housing 205, such that the heat shroud 221 does not play a role in the sector division.

The dividing member 221 has a radial flange portion 225 that is captured or sandwiched between the turbine housing 205 and the center housing 209, as shown in FIGS. 1 and 1A. The dividing member or heat shroud 221 is shown in isolation in FIGS. 5 through 7. A generally tubular, axially extending portion 226 extends from the radial flange portion 225 for a small distance and joins with a tapering portion 227 that extends axially and radially inwardly to form a radially inner boundary of the axial inlet to the turbine wheel 211. The dividing walls 223 join with the radial flange portion 225 and the tubular portion 226, and extend radially inwardly and circumferentially in a generally spiral fashion, terminating at radially inner ends that are adjacent to the tapering portion 227. The dividing member or heat shroud 221 thus directs each of the exhaust gas streams into the turbine wheel 211 in a substantially axial direction (i.e., with little or no radial component of velocity at the leading edges of the blades 231).

The turbine of this embodiment is of a vaneless or statorless design, also referred to herein as a "nozzleless" turbine. As compared to a design with vanes or nozzles, such a design advantageously is cost efficient, reliable (in that it eliminates parts from an environment in which they are likely to erode), avoids friction pressure losses, and avoids establishing a critical throat area that could choke the flow in some operating conditions. The absence of vanes or nozzles at the inlet means that the flow entering the wheel 211 has a substantial circumferential or swirl component of velocity.

Figure 3:
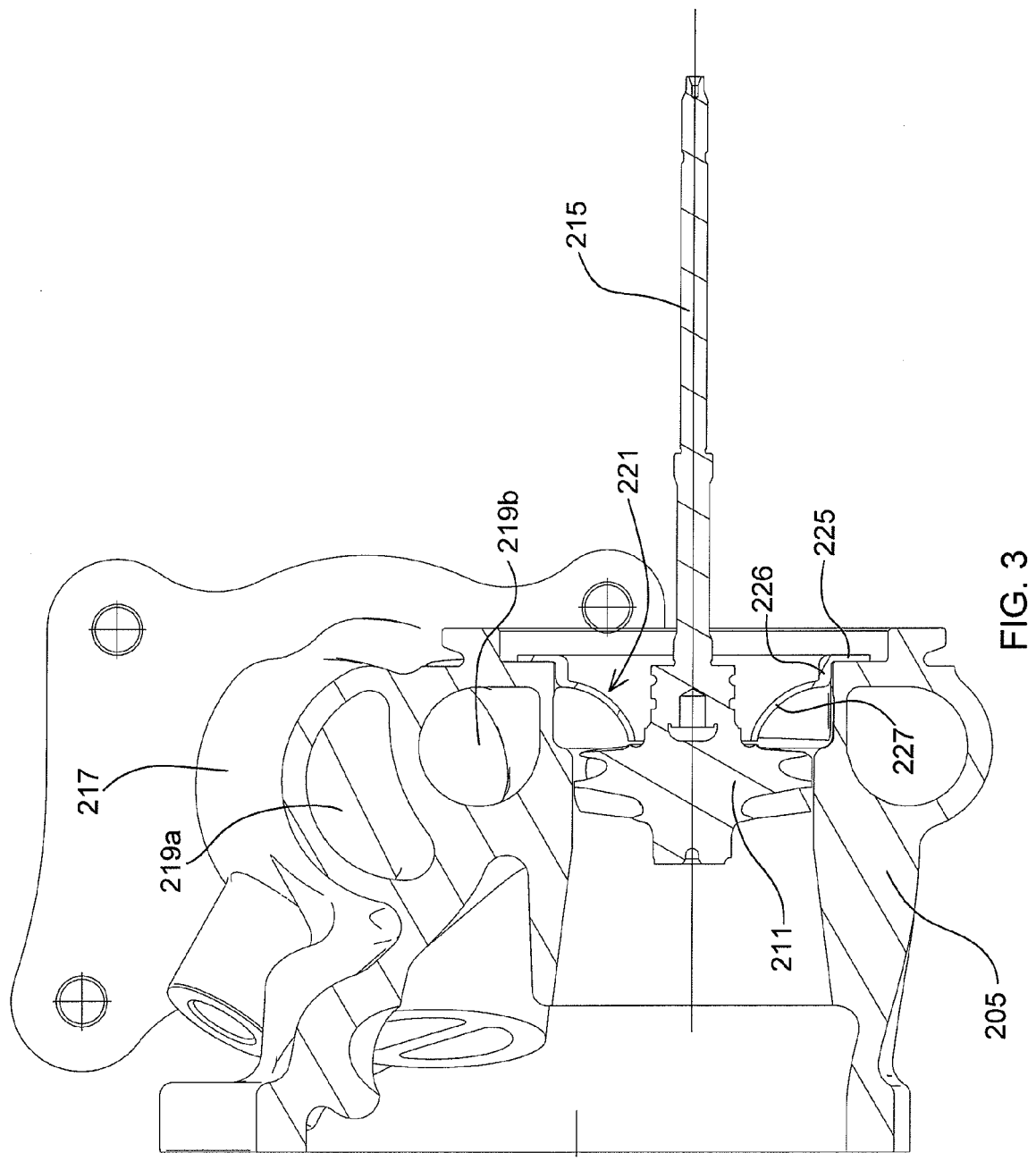
FIG. 3 is another sectioned view of the turbine assembly.
Figure 4:
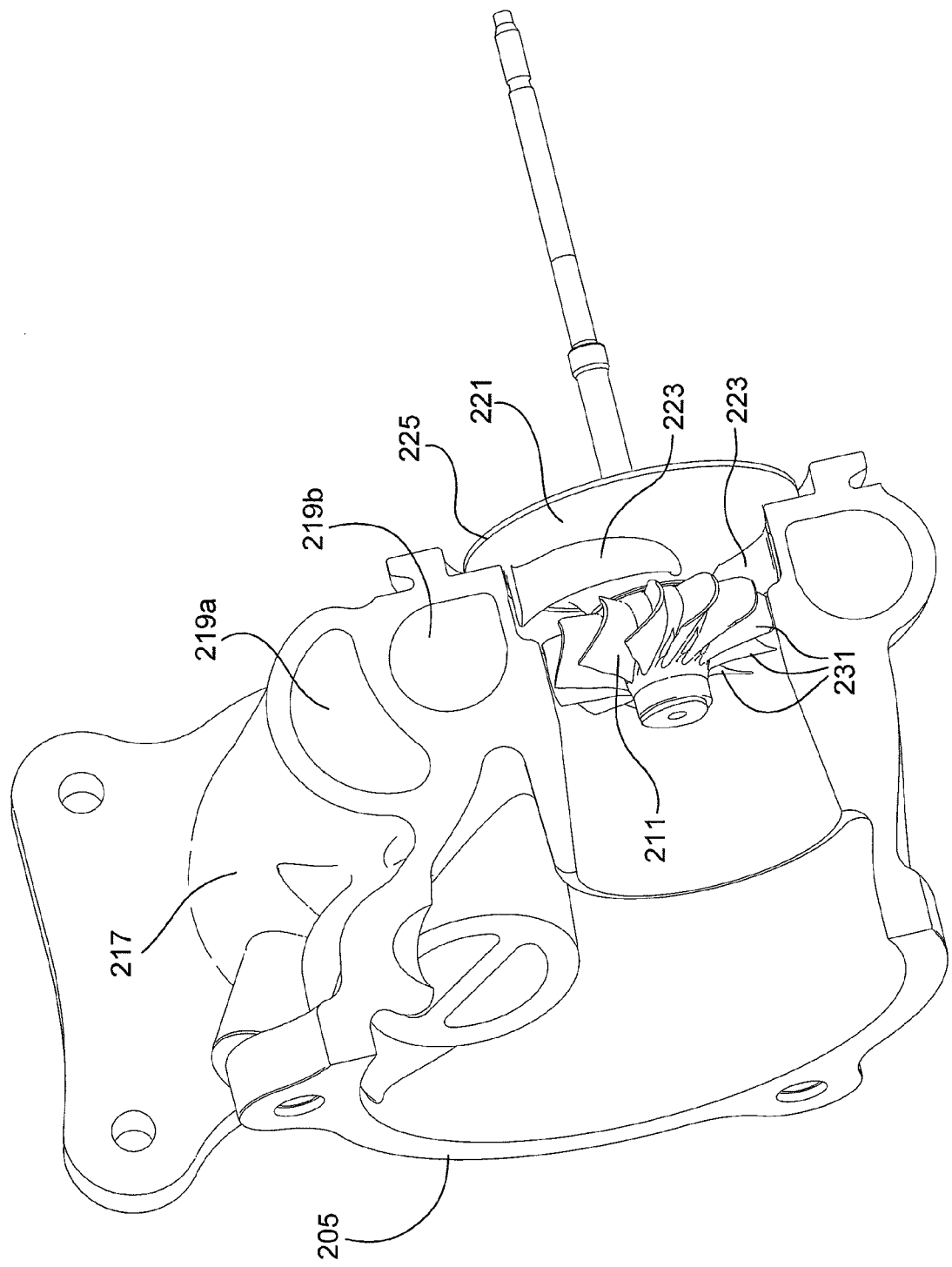
FIG. 4 is a sectioned isometric view of the turbine assembly.
Figure 8:
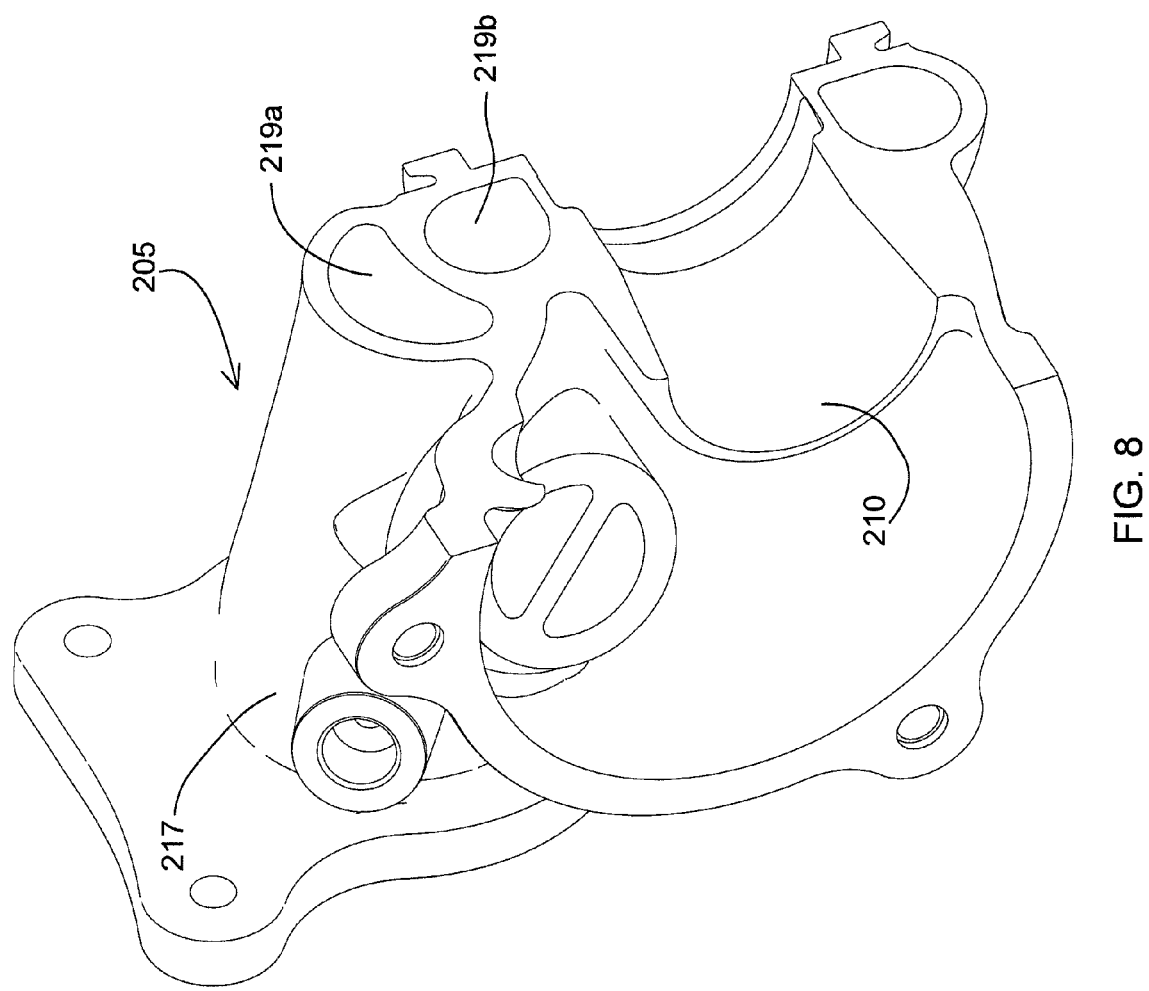
FIG. 8 is a sectioned isometric view of a turbine housing of the turbine assembly.

With reference to FIGS. 2-4, each of the angular sectors 219a and 219b comprises an inwardly spiraling passageway characterized by a convergent cross-section that spirals inward and converges to accelerate the exhaust gas, and to achieve supersonic speeds for at least some operating conditions of the engine (and thus of the turbocharger) as the exhaust gas is turned axially downstream and impinges on the axially upstream end of the blades 231. The potentially supersonic flows of the accelerated exhaust gas streams in the inner radius of the angular sectors 219a and 219b thus are directed into the turbine wheel 211 in a substantially axial direction.

With reference to FIG. 1, the compressor housing 207 and compressor wheel 213 form a dual, parallel, radial compressor. More particularly, the compressor wheel has two back-to-back oriented sets of impeller blades. A first set of impeller blades 301 are oriented in a conventional configuration with an inlet facing axially outward (away from the turbine) to receive air from that direction. A second set of impeller blades 303 are oriented in a reverse configuration with an inlet facing axially inward (toward the turbine) to receive air brought in tangentially and turned to travel axially into the second set of impeller blades. The first and second set of impeller blades can be manufactured in the form of a single, integral wheel, e.g., as illustrated, or may comprise an assembly of a plurality of parts.

The compressor housing 207 is configured to direct inlet air to each set of compressor blades in parallel, and to direct the passage of pressurized gas from each compressor. In this embodiment, the compressor housing comprises two separate axially positioned air inlets; namely, a first air inlet passage 305 that is positioned adjacent an end of the compressor housing to pass inlet air in an axial direction to the first compressor blades 301, and a second air inlet passage 307 that is separate from the first air inlet passage 305. Pressurized air that is provided by the compressor wheel 213 is directed radially from each set of impeller blades 301 and 303 through a single diffuser 311 to a compressor volute 313.

This dual-path, parallel, radial compressor configuration can operate at higher speeds than a comparable single-path radial compressor and might produce substantially no axial loading in steady state operation. The higher operating speeds will typically better match the operational speeds of the axial turbine.

The configuration of the present embodiment is significant for a number of reasons. As noted, the sector division of the turbine housing, which division extends all the way to the inlet to the turbine wheel 211, preserves as long as reasonably possible the separation or isolation of the pulses in the exhaust stream from one subgroup of engine cylinders from the pulses in the exhaust stream from the other subgroup of cylinders. This pulse division can improve the overall efficiency of the internal combustion engine because of improved valve charge exchange and decreased requirement for boost pressure.

Additionally the configuration of the described embodiment is particularly effective for overcoming the efficiency limitations that limit the effectiveness of turbochargers on small gasoline powered engines, where the practical limitations of conventional axial turbines render them relatively ineffective for practical and efficient use.

The described embodiment provides an effective turbine with large blades that can be efficiently manufactured, even in small sizes. The comparatively large size and small number of axial turbine blades are well suited to casting in small sizes when smaller blades might be too small for conventional casting techniques. The large blades do not require manufacturing tolerances that may be limiting when applied to a very small turbine.

Singularly, the use of either a no-axial-load turbine or a no-axial load compressor is less efficient than their conventional axially loaded counterpart. Moreover, turbines and compressors are typically configured to have partially offsetting axial loads. Although these loads are far from perfectly matched, they do provide at least some relief from axial loads. If only one component (i.e., either the turbine or the compressor) creates no axial load, the remaining load from the other component is not partially offset, and even greater axial loads occur, requiring an even larger thrust bearing.

In the present invention, a no-axial-load compressor is combined with a no-axial-load turbine, allowing for the use of much more efficient thrust bearings. It is believed that in some embodiments the thrust load requirements may be as small as only 20% of the conventional counterparts. Bearings configured to carry such small loads can be adapted to be substantially more energy efficient. As a result, despite the potentially lower efficiencies of some of the system components, the overall system efficiency of the turbocharger may be significantly higher than in a conventional counterpart.

While many conventional turbochargers are designed to produce no downstream swirl, some embodiments of the present invention may be configured with blades that produce either negative or even positive swirl. In designing a turbine under the present invention, the production of downstream swirl might be considered of less interest than the efficient extraction of energy while producing little or no axial loading.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An axial turbine for an exhaust-gas-driven turbocharger, the turbine having no inlet stator, and comprising:
   an axial turbine wheel comprising a hub and a plurality of blades extending generally radially outward from the hub, and a turbine housing assembly that houses the turbine wheel;
   the turbine housing assembly comprising a sector-divided turbine housing and a separately formed heat shroud, the sector-divided turbine housing defining a plurality of separate exhaust gas inlets into the turbine housing, each exhaust gas inlet for receiving a separate exhaust gas stream from an internal combustion engine, the sector-divided turbine housing further defining a plurality of separate angular sector passageways each of which occupies a fractional part of a circumference surrounding the turbine wheel, the angular sector passageways succeeding one another in a circumferential direction, each angular sector passageway being supplied with exhaust gas by a respective one of the plurality of exhaust gas inlets, each angular sector passageway being characterized by a convergent cross-section that spirals inward and converges to accelerate the exhaust gas;

the turbine housing assembly defining a separate sector outlet for each angular sector passageway through which the respective exhaust gas stream is fed into an inlet side of the turbine wheel generally in an axial direction of the turbine wheel, wherein the sector outlets are formed at least in part by the heat shroud.

2. The axial turbine of claim 1, wherein the heat shroud has a radial flange portion and, connected to the radial flange portion, a plurality of dividing walls that extend radially inwardly and circumferentially in a spiral fashion so as to divide the separate sector outlets from one another.

3. The axial turbine of claim 2, wherein the heat shroud has a tapering portion that extends axially from the radial flange portion and decreases in radius toward the inlet side of the turbine wheel to form a radially inner boundary of an axial inlet to the turbine wheel.

4. The axial turbine of claim 1, wherein an outer diameter of the turbine wheel, as defined by radially outer tips of the blades, is generally constant from the inlet side to an outlet side of the turbine wheel.

5. The axial turbine of claim 1, wherein there are two said exhaust gas inlets and two said angular sector passageways, each of the angular sector passageways occupying substantially 180 degrees along the circumference.

6. A turbocharger, comprising:

an axial turbine, the axial turbine having no inlet stator, and comprising:

an axial turbine wheel comprising a hub and a plurality of blades extending generally radially outward from the hub, and a turbine housing assembly that houses the turbine wheel;

the turbine housing assembly comprising a sector-divided turbine housing and a separately formed heat shroud, the sector-divided turbine housing defining a plurality of separate exhaust gas inlets into the turbine housing, each exhaust gas inlet for receiving a separate exhaust gas stream from an internal combustion engine, the sector-divided turbine housing further defining a plurality of separate angular sector passageways each of which occupies a fractional part of a circumference surrounding the turbine wheel, the angular sector passageways succeeding one another in a circumferential direction, each angular sector passageway being supplied with exhaust gas by a respective one of the plurality of exhaust gas inlets, each angular sector passageway being characterized by a convergent cross-section that spirals inward and converges to accelerate the exhaust gas;

the turbine housing assembly defining a separate sector outlet for each angular sector passageway through which the respective exhaust gas stream is fed into an inlet side of the turbine wheel generally in an axial direction of the turbine wheel, wherein the sector outlets are formed at least in part by the heat shroud;

a compressor comprising a compressor wheel mounted in a compressor housing, the compressor housing defining a compressor discharge volute receiving pressurized air from the compressor wheel;

a shaft having one end affixed to the compressor wheel and an opposite end affixed to the turbine wheel; and a center housing assembly connected between the turbine housing assembly and the compressor housing, the center housing assembly containing bearings for the shaft.

7. The turbocharger of claim 6, wherein the heat shroud has a radial flange portion and, connected to the radial flange portion, a plurality of dividing walls that extend radially inwardly and circumferentially in a spiral fashion so as to divide the separate sector outlets from one another.

8. The turbocharger of claim 7, wherein the heat shroud has a tapering portion that extends axially from the radial flange portion and decreases in radius toward the inlet side of the turbine wheel to form a radially inner boundary of an axial inlet to the turbine wheel.

9. The turbocharger of claim 6, wherein an outer diameter of the turbine wheel, as defined by radially outer tips of the blades, is generally constant from the inlet side to an outlet side of the turbine wheel.

10. The turbocharger of claim 6, wherein there are two said exhaust gas inlets and two said angular sector passageways, each of the angular sector passageways occupying substantially 180 degrees along the circumference.

* * * * *